(12) United States Patent
Frisch et al.

(10) Patent No.: US 7,712,993 B2
(45) Date of Patent: May 11, 2010

(54) DOUBLE SHEAR JOINT FOR BONDING IN STRUCTURAL APPLICATIONS

(75) Inventors: Douglas A. Frisch, Renton, WA (US); Marc J. Piehl, Renton, WA (US); Douglas L. Grose, Auburn, WA (US); Joseph L. Sweetin, Lake Forest Park, WA (US); Michael R. Chapman, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/948,042

(22) Filed: Nov. 30, 2007

(65) Prior Publication Data

US 2009/0142130 A1    Jun. 4, 2009

(51) Int. Cl.
*B64C 1/14* (2006.01)
(52) U.S. Cl. .................... 403/187; 244/132; 403/265
(58) Field of Classification Search ............. 403/187, 403/234, 237, 245, 265, 267; 244/131–133
See application file for complete search history.

(56) References Cited

U.S. PATENT DOCUMENTS

| | | | | |
|---|---|---|---|---|
| 3,814,655 | A | * | 6/1974 | Weill et al. ............... 156/293 |
| 4,067,155 | A | * | 1/1978 | Ruff et al. .................. 52/105 |
| 4,219,980 | A | * | 9/1980 | Loyd ....................... 52/309.1 |
| 4,749,601 | A | * | 6/1988 | Hillinger ................... 428/73 |
| 4,962,904 | A | | 10/1990 | Perry et al. |
| 5,171,099 | A | * | 12/1992 | Westre ..................... 403/264 |
| 5,476,704 | A | * | 12/1995 | Kohler ..................... 428/119 |
| 5,735,626 | A | * | 4/1998 | Khatiblou et al. ......... 403/16 |
| 5,778,571 | A | * | 7/1998 | Pasqualini et al. ......... 37/455 |
| 6,502,788 | B2 | * | 1/2003 | Noda et al. ............. 244/123.3 |
| 6,595,467 | B2 | * | 7/2003 | Schmidt ................... 244/119 |
| 6,729,792 | B2 | * | 5/2004 | Pritzer ..................... 403/286 |
| 6,749,155 | B2 | * | 6/2004 | Bergmann ................ 244/133 |
| 6,840,750 | B2 | * | 1/2005 | Thrash et al. ............ 425/129.1 |
| 6,913,225 | B2 | * | 7/2005 | Arulf et al. ................. 244/10 |
| 6,945,727 | B2 | * | 9/2005 | Christman et al. ....... 403/109.8 |
| 7,244,487 | B2 | * | 7/2007 | Brantley et al. ........... 428/119 |
| 7,393,488 | B2 | * | 7/2008 | Grose et al. ............... 264/254 |

(Continued)

FOREIGN PATENT DOCUMENTS

GB       1050884       12/1966

(Continued)

OTHER PUBLICATIONS

UK Combined Search and Examination Report for Application No. GB0820727.6, dated Dec. 31, 2008, 6 pages.

*Primary Examiner*—Michael P Ferguson
*Assistant Examiner*—Joshua T Kennedy
(74) *Attorney, Agent, or Firm*—Lee & Hayes, PLLC

(57) ABSTRACT

A bonded composite joint may include a base having a foot configured to couple to a member. The base may include a flange extending outward from the foot. The joint further may include a panel having a core positioned between opposing skins, where the skins have inner walls proximate the core and the skins extend outward beyond the core on at least one end of the panel to define a recess between the skins. The recess between the skins may receive the flange. A bonding agent may be used to couple the flange to the inner walls of the panel.

6 Claims, 6 Drawing Sheets

U.S. PATENT DOCUMENTS

| | | |
|---|---|---|
| 2004/0011927 A1 | 1/2004 | Christman et al. |
| 2004/0051005 A1 | 3/2004 | Bergmann |
| 2005/0139314 A1* | 6/2005 | Bersuch et al. ............. 156/286 |
| 2005/0186390 A1 | 8/2005 | Bersuch et al. |
| 2008/0259628 A1* | 10/2008 | Lin ............................ 362/520 |

FOREIGN PATENT DOCUMENTS

WO      WO0162474 A1      8/2001

* cited by examiner

Cross Section A-A

DOUBLE SHEAR JOINT FOR BONDING IN STRUCTURAL APPLICATIONS

TECHNICAL FIELD

The present disclosure teaches methods and apparatus for bonding panels, and more specifically, to methods and apparatus for providing a double shear joint for bonding structural applications.

BACKGROUND

Composite materials, such as graphite-epoxy, are used in the manufacture of aircraft structures because they have high strength-to-weight ratios. Initially, only lightly loaded or non-critical parts were manufactured from composite materials. As the technology has advanced, however, a greater percentage of aircraft parts, including critical structural members, have been manufactured using composite materials.

FIG. 1 illustrates a prior art joining apparatus 100 for joining a sandwich panel 102 to a structure 104. The joining apparatus 100 includes a base 106 having a flange 108 projecting outwardly from a foot 110. The sandwich panel 102 has a maximum thickness 112 and converges to a minimum thickness 114 at a connection portion 116. The sandwich panel 102 includes a low density core portion 118 situated between skin portions 120. The core portion 118 includes a wedge portion 122 where the skin portions converge to form the connection portion 116. The flange 108 and the connection portion 116 are coupled with a fastener 124.

As shown in FIG. 1, the connection portion 116 is provided for a number of reasons. One reason is to isolate the core portion 118 with the skin portions 120. As discussed, the core portion 118 is formed from a low density material and therefore is not ideal for receiving the fastener 124. Another reason is to increase the strength of the sandwich panel 102 at the connection portion 116. The connection portion 116 includes increased skin thickness as compared to the thickness of the skin portion 120 adjacent to the core portion 118.

There are a number of shortcomings to the joining apparatus 100 described above. For example, the wedge portion 122 and corresponding structure (e.g., converging skin portions 120) increase part complexity and typically requires a special manufacturing process and specific design requirements for each different application. This makes modifications difficult when design requirements are not satisfied and increases design and manufacturing costs. In addition, manufacturing processes for securing coupling may be reduced or eliminated by improved methods for fastening the sandwich panel 102 and the base 106. The fastener 124 also adds additional weight to the joining apparatus 100, which is disadvantageous in aircraft applications or other applications where weight reduction is beneficial.

SUMMARY

Embodiments of methods and apparatus for providing a double shear joint for bonding in structural applications are disclosed. In one embodiment, a bonded composite joint includes a base having a foot configured to couple to a member, the base including a flange extending outward from the foot. The joint further includes a panel having a core configured between opposing skins, the skins having inner walls proximate the core, the skins extending outward beyond the core on at least one end of the panel to define a recess between the skins, the recess configured to receive the flange. A bonding agent is used to couple the flange to the inner walls of the panel.

In another embodiment, a method for joining a structure to a base includes removing a core portion configured between skins to create a recess on a structure and positioning the recess of the structure proximate the base, the base including a flange projecting away from the base, the flange configured to insert into the recess. A bonding agent may be applied to a gap defined by the volume between the flange and the skins to couple the structure and the base after a curing process.

In a further embodiment, a joint apparatus includes a composite sandwich panel having skins for each exterior sidewall and a core configured between the skins, the skins extending beyond the core at an end of the sandwich panel to define a recess. A base may have a foot and a flange extending outward from the foot, the flange configured for insertion into the recess, the flange bonded between two skins with a bonding agent.

The features, functions, and advantages can be achieved independently in various embodiments of the present disclosure or may be combined in yet other embodiments.

BRIEF DESCRIPTION OF THE DRAWINGS

Embodiments of methods and apparatus in accordance with the present disclosure are described in detail below with reference to the following drawings.

DETAILED DESCRIPTION

Methods and apparatus for providing a double shear joint for bonding in structural applications are described herein. Many specific details of certain embodiments of the disclosure are set forth in the following description and in FIGS. 2 through 9 to provide a thorough understanding of such embodiments. One skilled in the art, however, will understand that the present disclosure may have additional embodiments, or that the present disclosure may be practiced without several of the details described in the following description.

Figure 1:
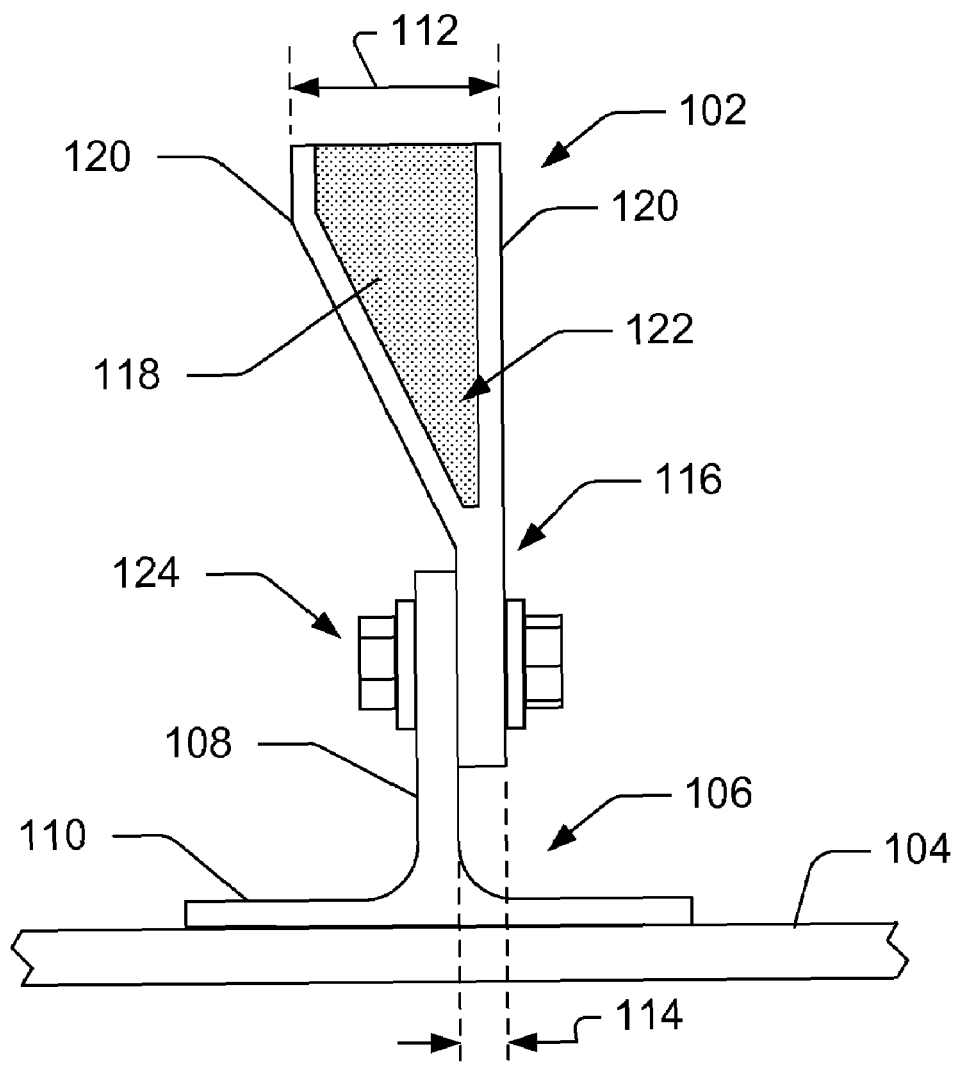
FIG. 1 illustrates a joining apparatus including a first and a second structure coupled with a fastener in accordance with the prior art.
Figure 2:
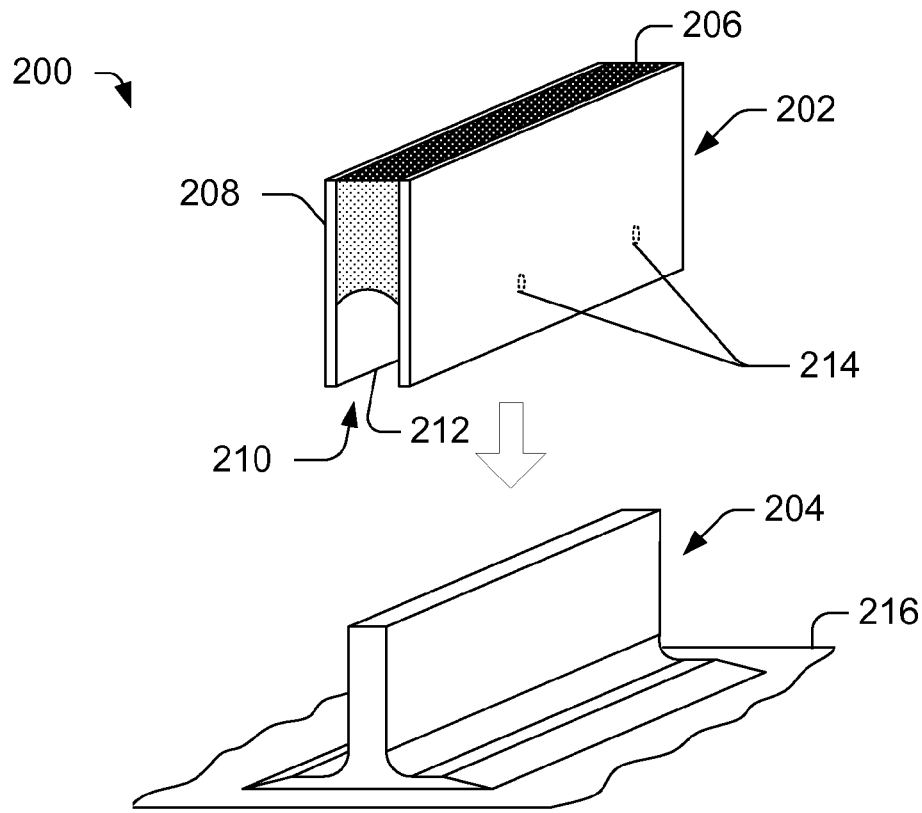
FIG. 2 is an exploded isometric view of an illustrative structure and a base in accordance with an embodiment of the disclosure.

FIG. 2 is an exploded isometric view of an illustrative structure 202 and a base 204 in accordance with an embodiment of the disclosure. In an environment 200, the structure 202 may be a sandwich panel structure including a core portion 206 configured between skin portions 208. The core portion may be formed from a low density material such as foam, honeycomb, or another low density core material. The skin portions 208 may be formed from a composite material, such as graphite-epoxy or other composite materials. The skin portions 208 may extend beyond the core portion 206 to create a recess 210. The recess 210 exposes the inner side 212 of the skin portions 208. In some embodiments, the skin portions 208 include apertures 214, which will be described in further detail below.

The base 204 may be situated on a second structural portion 216. The second structural portion 216 may be substantially similar to the structure 202 and may, in some embodiments, include the core portion 206 and skin portions 208. Alternately, the second structural portion 216 may be formed from other materials and/or configurations, such as without limitation metal, wood, composites, plastics or other polymer based materials, and the like.

The structure 202 may be used in any suitable structural application. In particular, the structure 202 may be advantageous in applications where reduced weigh is an important design consideration, such as vehicle manufacture applications. One application may include aircraft assembly, such as using the structure 202 as a skin panel or rib panel in an aircraft wing or fuselage, among a variety of possible applications.

Figure 3:
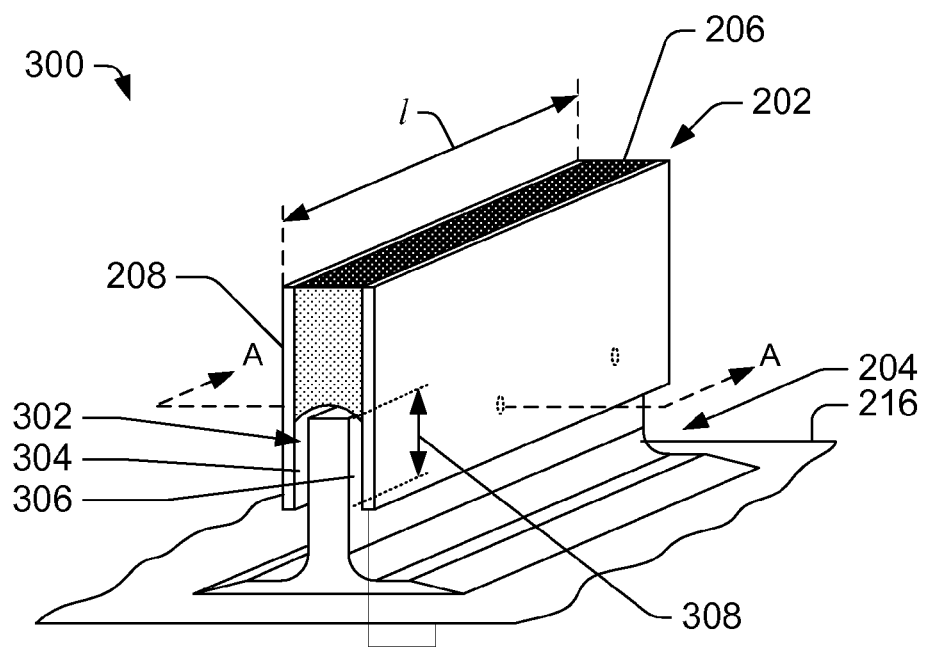
FIG. 3 is an isometric view of an illustrative joint assembly including the structure and the base of FIG. 2 in accordance with an embodiment of the disclosure.

FIG. 3 is an isometric view of an illustrative joint assembly 300 including the structure 202 of FIG. 2 and the base 204 in accordance with an embodiment of the disclosure. As illustrated, the joint assembly 300 includes the structure 202 having a length l bonded or otherwise coupled to the base 204. In some embodiments, an adhesive may be applied to a gap 302. The gap 302 may be defined between a first surface 304, including the inner side 212 (shown in FIG. 2) of the skin portions 208 and the core 206 portion, and a second surface 306, including the exterior of the base 204. In some embodiments, the gap 302 may be at least 0.02 inches wide at all locations within the gap 302 to provide adequate clearance to receive a bonding agent for bonding the joint assembly 300. The gap may also be as much as 0.120 inches wide to allow for part tolerance buildup on an assembly. An overlap 308 is defined by the overlap of material along the flange of the first continuous surface 304 and the second continuous surface 306. In some embodiments, the overlap 308 is at least 1.0 inches to enable adequate application of a bonding agent to resist a shear stress when the joint assembly 300 is subjected to a tensile force.

Figure 4:
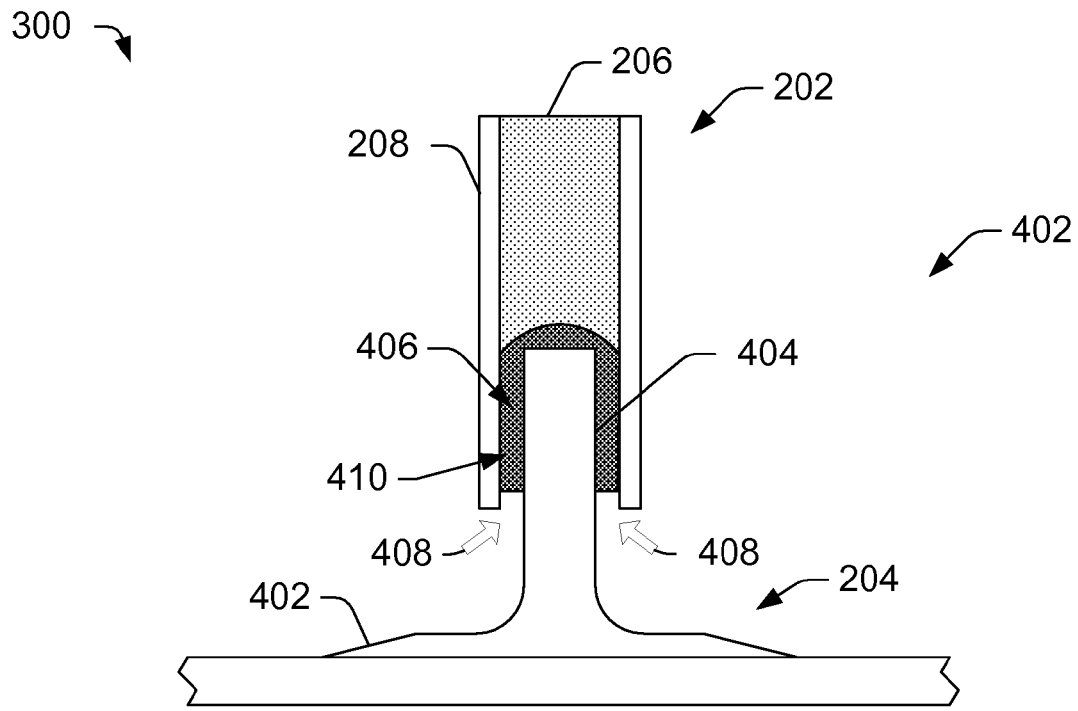
FIG. 4 is a side elevation view of the joint assembly of FIG. 3 in accordance with an embodiment of the disclosure.

FIG. 4 is a side elevation view of the joint assembly 300 of FIG. 3 in accordance with an embodiment of the disclosure. In some embodiments, the skin portions 208 are substantially parallel in the structure 202 and therefore do not converge. As previously described, the skin portions 208 extend beyond the core portion 206 to form the recess 210 shown in FIG. 2. In some embodiments, the structure 202 may require a manufacturing operation to create the recess 210. In one example operation, the recess 210 is formed by machining, boring, milling, or otherwise removing a portion of the core portion 206 to create the recess 210. Alternatively, the core may be configured with removable sections. For example, a removable core section may be taped to the skin portion 208 and/or the non-removable section of the core portion 206. Maintaining a removable core section in the structure 202 prior to assembly may be advantageous to protect the skin portions 208 and to enable customized fitting and assembly of the joint assembly 300, as discussed in further detail below.

In accordance with some embodiments, the base 204 includes a foot 402 and a flange 404. As shown in FIG. 4, the flange 404 may be configured at an approximately 90 degree angle with respect to the foot 402 to form a T-shape. In other implementations, the flange 404 may be configured at other angles with respect to the foot 402. The base 204 may be a standardized size and therefore used with many different structures. For example, the width of the flange 404 may be a predetermined width that does not vary based on the width of the structure 202. A standardized base may reduce part inventories and manufacturing time, and therefore advantageously reduce cost of the joint assembly 300. The base 204 may be formed from a composite material, such as graphite-epoxy or other composite materials. Alternatively, the base may be formed from metal, plastics or other polymer based materials, or other materials sufficient for meeting design requirements of the joint assembly 300.

In further embodiments, the structure 202 and the base 204 may be bonded using a bonding agent 406. The bonding agent 406 may be any adhesive capable of securely bonding the structure 202 to the base 204. In some embodiments, the bonding agent 406 is a room temperature cure paste such as EA9394 adhesive. The bonding agent 406 creates a double bonding between the skin portions 208 and the flange 404, such that the bonding agent secures each of the skin portions 208 to a different face of the flange 404, thereby creating a double shear strength bonding resistance when the structure 202 and the base 204 are subjected to a tensile force applied substantially parallel to a centerline of the flange 404. The bonding agent 406 may be applied into the gap 302 (shown in FIG. 3) at inlets 408. In some embodiments, the bonding agent 406 may be applied to the joint assembly 300 using a pressurized applicator or other device for injecting the bonding agent into the gap 302 at the inlets 408.

Figure 5:
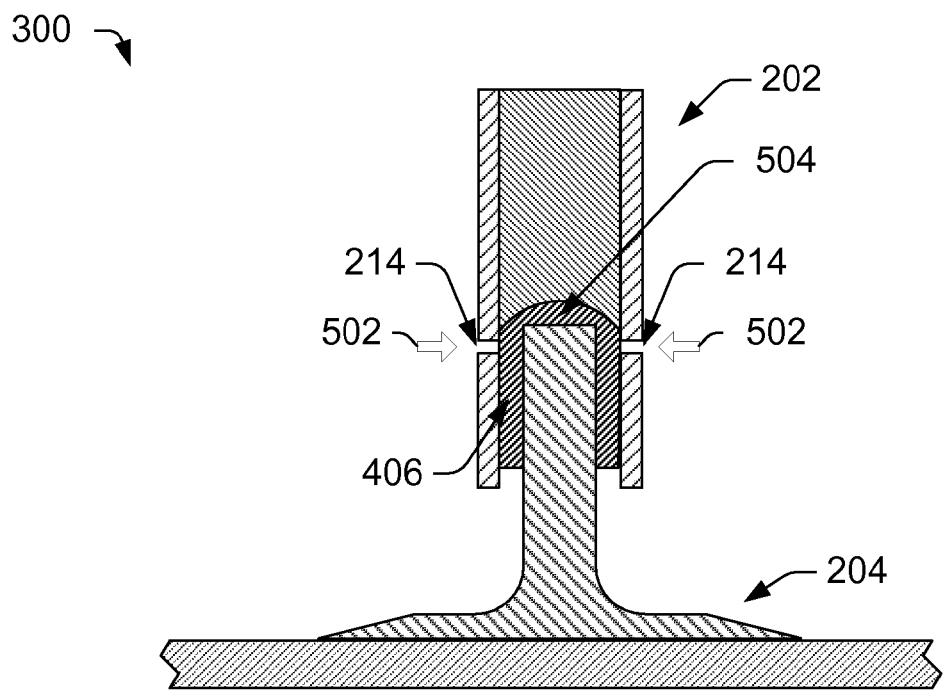
FIG. 5 is a cross-sectional view of the joint assembly of FIG. 3 including apertures in accordance with another embodiment of the disclosure.

FIG. 5 is a cross-sectional view of the joint assembly 300 of FIG. 3 including the apertures 214 in accordance with another embodiment of the disclosure. In some embodiments, the apertures 214 enable an alternative entry point 502 for an application of the bonding agent 406 used to secure the joint assembly 300. The apertures 214 may be spaced apart along the length l of the structure 202. In some instances, the location of the apertures 214 may alternate from side to side along each of the skin portions 208 (shown in FIG. 2) while in other instances the apertures may be substantially aligned for each of the skin portions 208. In some embodiments, the apertures advantageously enable improved access for the application of the bonding agent 406 to a top portion 504 of the gap 302, thereby creating a stronger bond between the structure 202 and the base 204.

In alternative embodiments, the bonding agent 406 may be applied to the structure 202 and/or the base 204 prior to assembly of the respective parts. For example, when using slow curing bonding agents, the bonding agent 406 may be applied in advance of an assembly. However, when quick drying adhesives are used to bond the structure 202 to the base 204 to form the joint assembly 300, the inlets 408 (shown in FIG. 4) or the entry point 502 through the apertures 214 may be advantageous, particularly when complicated structures are jointed to a respective base when securing fixtures for a curing process may require time consuming steps and may not be completed prior to an onset of the bond.

Figure 6:
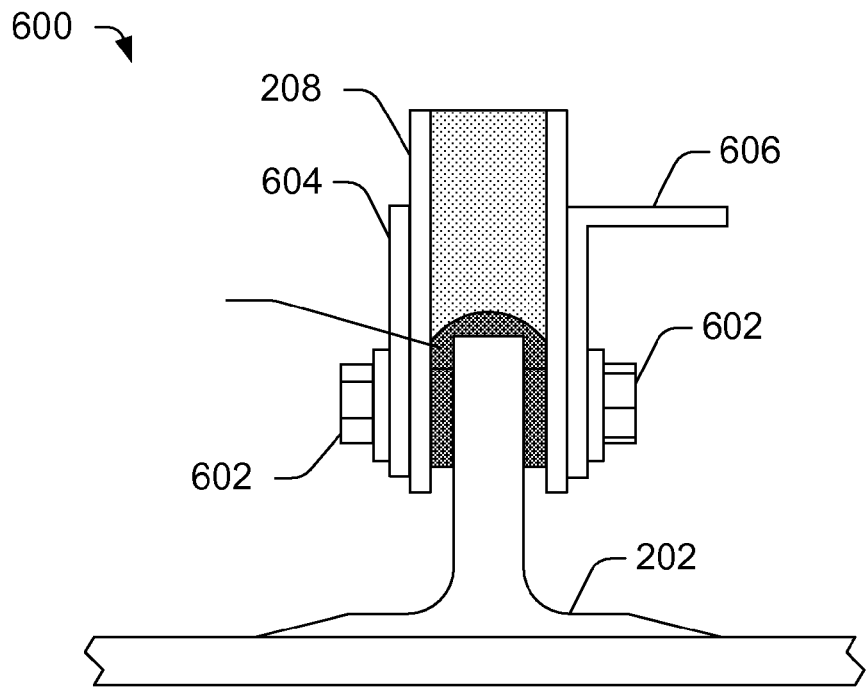
FIG. 6 is a side elevational view of an illustrative joint assembly including a fastener and reinforcing panels in accordance with another embodiment of the disclosure.

FIG. 6 is a side elevational view of an illustrative joint assembly 600 including a fastener 602, a reinforcing structure 604, and mating structure 606 in accordance with another embodiment of the disclosure. Although fasteners typically add increased weight to the joint assembly 600, they may be advantageous in some applications such as when the reinforcing structure 604 or the mating structure 606 needs to be fastened to the panel. As shown, the joint assembly 600 includes a bonding agent 608 in the gap 302 (shown in FIG. 3). The bonding agent 608 may act to reinforce the area near the fastener 602 and therefore enable use of the fastener 602 without compromising the strength of the joint assembly 600 such as by creating stress points near the fastener. The fastener 602 may include a threaded bolt and nut fastener, a bolt and secure pin, a U-shaped clip, or any other type of fastener used to connect an adjacent structure.

In additional embodiments, the joint assembly 600, or any other joint assembly with or without the fastener 602, may include one or both of the reinforcing panel 604 or the mating structure 606. The reinforcing structure 604 may be used to add additional strength skin portions 208. In other embodiments, the skin portions 208 may vary in thickness along the skin portion to provide increased strength in advantageous locations, such as proximate the recess 210. The mating structure 606 may be used to enable coupling of an additional structure. In contrast to the prior art joining apparatus 100, the disclosed joint assembly 600 includes substantially straight skin portions 208 that are bonded around the base 202, which enable easy application of additional layers of reinforcing materials, such as skin sections or other reinforcing or mating structures and/or materials.

Figure 7:
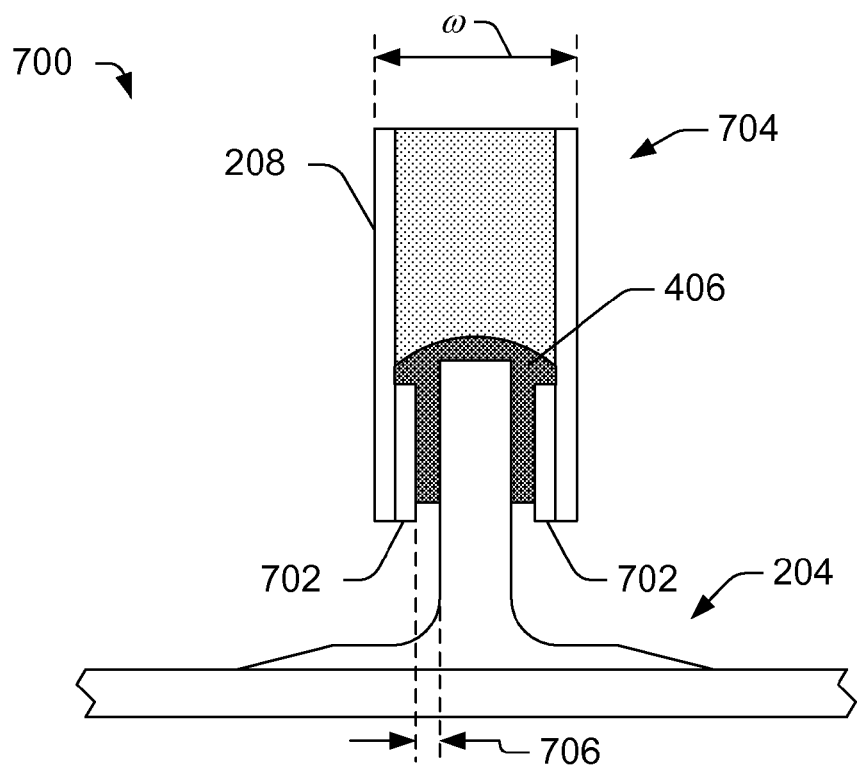
FIG. 7 is a side elevational view of an illustrative joint assembly including spacing panels in accordance with still another embodiment of the disclosure.

FIG. 7 is a side elevational view of an illustrative joint assembly 700 including spacing panels 702 in accordance with still another embodiment of the disclosure. As alluded to above, the base 204 may have standardized measurements in some instances while a width w of a structure 704 may vary, therefore creating a variance in a gap spacing 706. In an instance where an excessively large gap is present, the spacing panels 702 may be coupled to the inside face of the skin portions 208 to reduce the gap spacing 706. For example, a slight misalignment of the structure and base may cause a non-conforming gap. The gap spacing 706 may be determined by design requirements specific to the bonding agent 406 used to secure the joint assembly 700. In some embodiments, the gap spacing 706 is greater than 0.02 inches.

Figure 8:
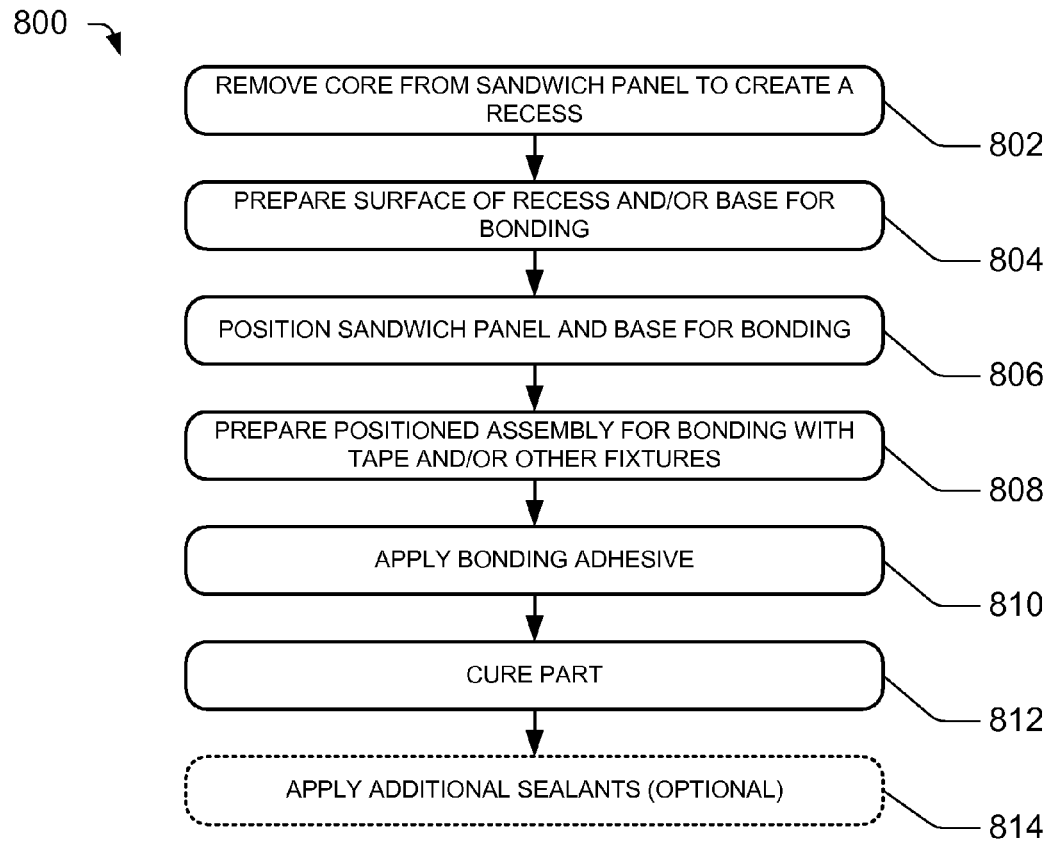
FIG. 8 is a flow diagram illustrating an example process for assembling a joint assembly in accordance with an embodiment of the disclosure.

FIG. 8 is a flow diagram illustrating an example process 800 for assembling a joint assembly in accordance with an embodiment of the disclosure. The process 800 is presented in an organization of blocks (operations), however, the order of the operations are not intended as a limitation. Embodiments may include alternative arrangements of the operations, conducted in series and/or in parallel, without departing from the scope of the process 800.

The process 800 includes assembling the joint assembly, such as joint assembly 300 including the structure 202 and the base 204. At 802, the core of the structure 202 is removed to create the recess 210. The core may be removed by a machining process such as by drilling, boring, or milling the core portion 206 from the structure 202. Alternatively, the core portion 206 may be removable without machining, such as an instance where the core portion is secured in the structure with tape or another semi-permanent adhesive. The surfaces forming the recess 210 and portions of the base 204 may be prepared for bonding at 804. For example, the surfaces may be grit-blasted or chemically treated to prepare the surface for the application of the bonding agent 406.

The assembly of the structure 202 and the base 204 may include movement or other positioning of the structure 202 and/or the base 204 relative to one another at 806. In some instances, at 808, the structure 202 and/or the base 204 may be securely positioned with fixtures to position the assembly. In addition, tape may be applied to cover a portion of the inlets 408 to prevent the bonding agent 406 from exiting the gap 302 before the bonding agent has fully cured. For example, tape or another barrier may be placed over the inlets 408 and then slots may be cut into the tape that enable access to the gap when the bonding agent 406 is applied to the joint assembly. The tape may prevent run off of the bonding agent after an application or it may otherwise constrain the bonding agent in the gap 302. The bonding agent is applied at 808 to secure the joint assembly. After the application of the bonding agent, the joint assembly typically needs to cure for a number of hours or days before the resulting cured bond is sufficient to secure the joint assembly.

In some applications, an additional sealant may be applied to one or both sides of the joint assembly along the seam line defined by the exposed bonding agent 406 between the structure 202 and the base 204. In an implementation when the joint assembly is a sidewall of a fluid container, the additional sealant may be applied to the joint assembly at 814. For example, the structure 202 may be a sidewall of a fuel tank and the additional sealant may be a fuel sealant which protects the bonding agent 406 from adverse affects from exposure to the fluid (e.g., aircraft fuel). The additional sealant may also delay environmental degradation of the joint assembly.

An advantage of the disclosed joint assembly is the ability to modify a structure to fit a particular application. For example, a stock (uniform sized) structure may be cut to shape and assembled to the base 204 using the process 800, thereby reducing cost for design and fabrication. In addition, more than one side of the structure may be assembled to a base, such as the base 204. For example, an airtight container may be formed by attaching structures with the joint assembly disclosed herein. The joint assembly disclosed herein, therefore, may be used in a variety of applications with a minimal part count.

Figure 9:
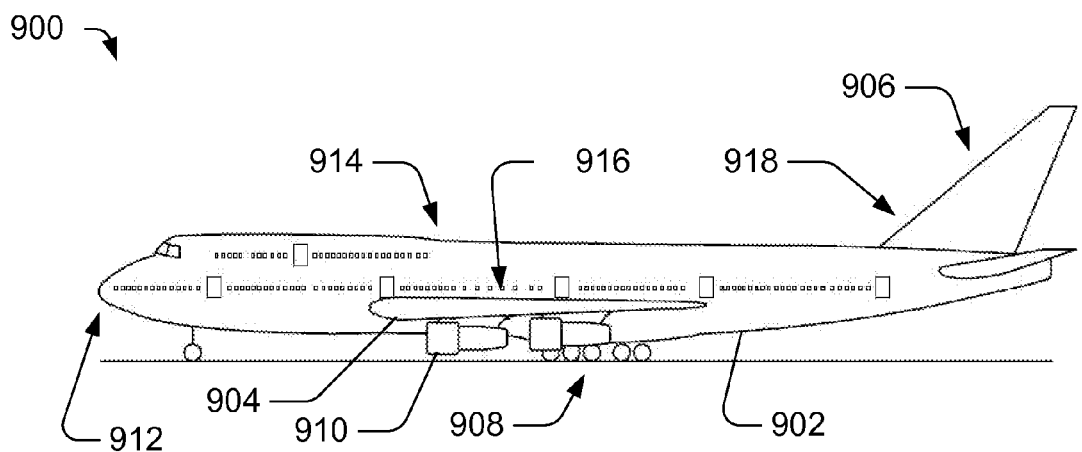
FIG. 9 is a side elevational view of an aircraft having one or more joint assemblies in accordance with another embodiment of the disclosure.

FIG. 9 is a side elevational view of an aircraft having one or more joint assemblies in accordance with another embodiment of the disclosure. One may appreciate that joint assemblies may be employed in a wide variety of locations, including the fuselage, wings, empennage, body, and walls of the aircraft 900. In alternate embodiments, joint assemblies may be used on other types of structures, vehicles, and platforms, such as motor vehicles, aircraft, maritime vessels, or spacecraft, or other suitable applications. For example, the aircraft 900 may include many joint assemblies as disclosed herein throughout the skin of the aircraft in accordance with an embodiment of the disclosure.

In this embodiment, the aircraft 900 includes a fuselage 902 including wing assemblies 904, a tail assembly 906, and a landing assembly 908. The aircraft 900 further includes one or more propulsion units 910, a control system 912 (not visible), and a host of other systems and subsystems that enable proper operation of the aircraft 900. One should appreciate that joint assemblies may be employed in any suitable portion of the aircraft 900, such as in a fuselage 902 with a fuselage joint assembly 914, the wing assemblies 904 with a wing assembly joint assembly 916, the tail assembly 906 with a tail assembly joint assembly 918, and any other suitable areas of the aircraft 900. In general, the various components and subsystems of the aircraft 900 may be of known construction and, for the sake of brevity, will not be described in detail herein.

Although the aircraft 900 shown in FIG. 9 is generally representative of a commercial passenger aircraft, including, for example, the 737, 747, 757, 767, 777, and 787 models commercially available from The Boeing Company of Chicago, Ill., the apparatus and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

Figure 10:
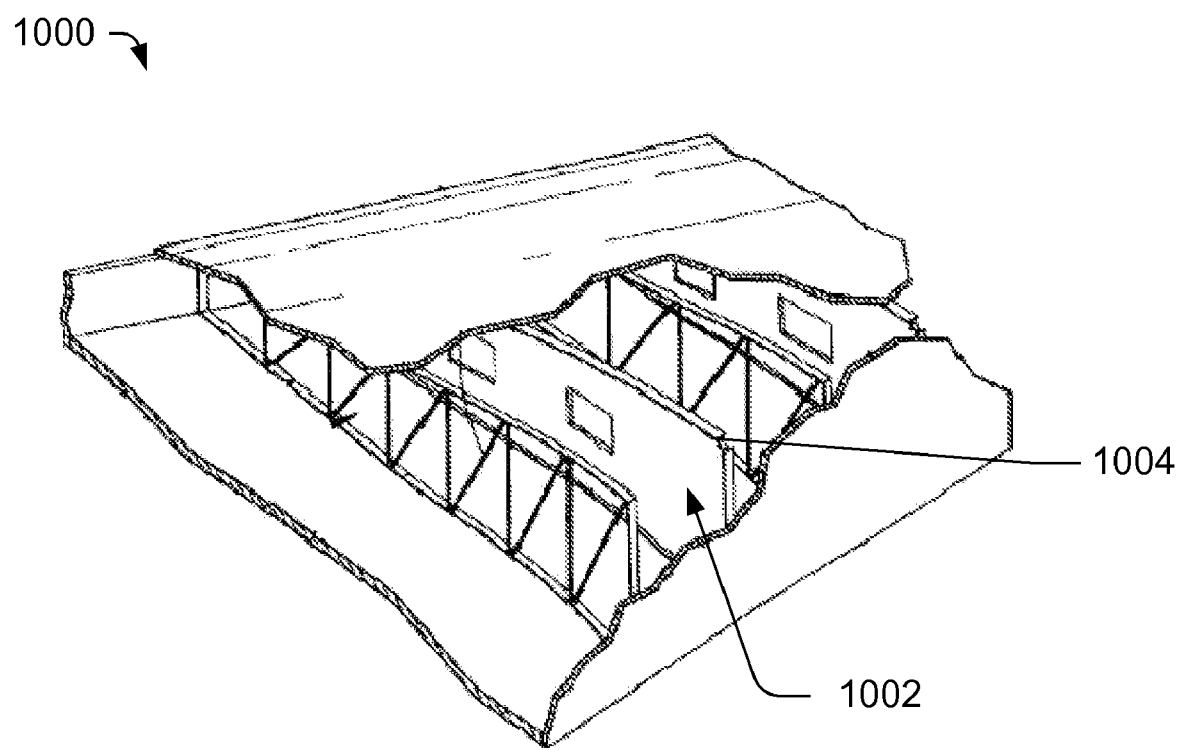
FIG. 10 is a cut-away isometric view of an aircraft wing structure having a plurality of panels joined by an illustrative joint assembly in accordance with still another embodiment of the disclosure.

FIG. 10 is a cut-away isometric view of an aircraft wing structure 1000 having a plurality of panels joined by an illustrative joint assembly in accordance with still another embodiment of the disclosure. As illustrated, a structure 1002 may be securely assembled in the aircraft wing structure 1000 with a double sheer joint 1004, as disclosed herein.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A joint apparatus, comprising:
   a composite sandwich panel having a first skin and a second skin that define exterior sidewalls and a core coupled between an inner surface of the first skin and an inner surface of the second skin, the skins extending beyond the core at an end of the composite sandwich panel to define a recess, wherein at least one of the first skin or the second skin includes an aperture where the skins extend beyond the core, the aperture to facilitate an application of a bonding agent into the recess; and
   a unitary one-piece base having a foot and a flange, the flange protruding outward from the foot, the flange extending into the recess defined by the skins, the flange having a first planar outer surface and a second planar outer surface; a bonding agent applied through the aperture into the recess such that the first planar outer surface is bonded to an inner surface of the first skin and the second planar outer surface is bonded to an inner surface of the second skin; and
   a spacing panel positioned inside the defined recess, a first side of the spacing panel being coupled to at least one of the first skin or the second skin where the skins extend beyond the core, and a second side of the spacing panel that is opposite the first side being adjacent the bonding agent used to secure the composite sandwich panel to the unitary one-piece base such that the spacing panel reduces a volume of the bonding agent used to secure the composite sandwich panel to the unitary one-piece base.

2. The joint apparatus of claim 1, wherein the core is composed of a low density honeycomb, the skins and the base being composed of composite graphite epoxy.

3. The joint apparatus of claim 1, wherein the bonding agent is a room temperature cure paste.

4. The joint apparatus of claim 1, wherein the flange and the skins define a gap configured to receive the bonding agent, the gap being at least 0.02 inches in width.

5. The joint apparatus of claim 1, wherein the flange and the skins define a gap configured to receive the bonding agent, and wherein a width of the spacing panel is less than the gap.

6. The joint apparatus of claim 1, wherein the spacing panel does not engage the core disposed between the skins of the composite sandwich panel.

* * * * *